US007447861B2

(12) United States Patent
Burka

(10) Patent No.: US 7,447,861 B2
(45) Date of Patent: Nov. 4, 2008

(54) INTEGRATED MULTI-FUNCTION OBJECT LOCKS

(75) Inventor: Peter W. Burka, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 10/890,751

(22) Filed: Jul. 14, 2004

(65) Prior Publication Data

US 2006/0015700 A1 Jan. 19, 2006

(51) Int. Cl.
*G06F 12/14* (2006.01)
(52) U.S. Cl. .......................... 711/164; 711/163; 726/17
(58) Field of Classification Search ........................ None
See application file for complete search history.

(56) References Cited

U.S. PATENT DOCUMENTS

| 6,173,442 | B1 | 1/2001 | Agesen et al. |
| 6,247,025 | B1* | 6/2001 | Bacon ........................ 707/206 |
| 6,487,652 | B1 | 11/2002 | Gomes et al. |
| 6,792,601 | B1* | 9/2004 | Dimpsey et al. ............ 718/102 |
| 7,035,870 | B2* | 4/2006 | McGuire et al. ........ 707/103 R |
| 2001/0014908 | A1 | 8/2001 | Onodera |

OTHER PUBLICATIONS

"The Merriam-Webster Dictionary", New Edition, 2005, Merriam-Webster Inc., pp. 540.*
Onodera et al., A Study of Locking Objects with Bimodal Fields, 1999, ACM 1-58113-238, pp. 223-237, Japan.

* cited by examiner

*Primary Examiner*—B. James Peikari
(74) *Attorney, Agent, or Firm*—Steve Calogero; Hoffman Warnick LLC

(57) ABSTRACT

A single lock word comprises an identifier field for storing a thread identifier associated with a first thread obtaining a lock on an object; an inflation field for storing a fat lock bit upon inflation of the lock on the object; and a contention field for storing a contention bit in response to an attempt by a second thread to obtain a lock on the object. The values of the single lock word are verified with a single memory fetch instruction. When unlocking an object, a single memory fetch instruction can be used to read the lock word to: (1) determine whether thread T is still the current owner of the lock, and (2) determine the states of inflation and/or contention (i.e., determine whether the fat lock and/or contention bits have been set).

34 Claims, 3 Drawing Sheets

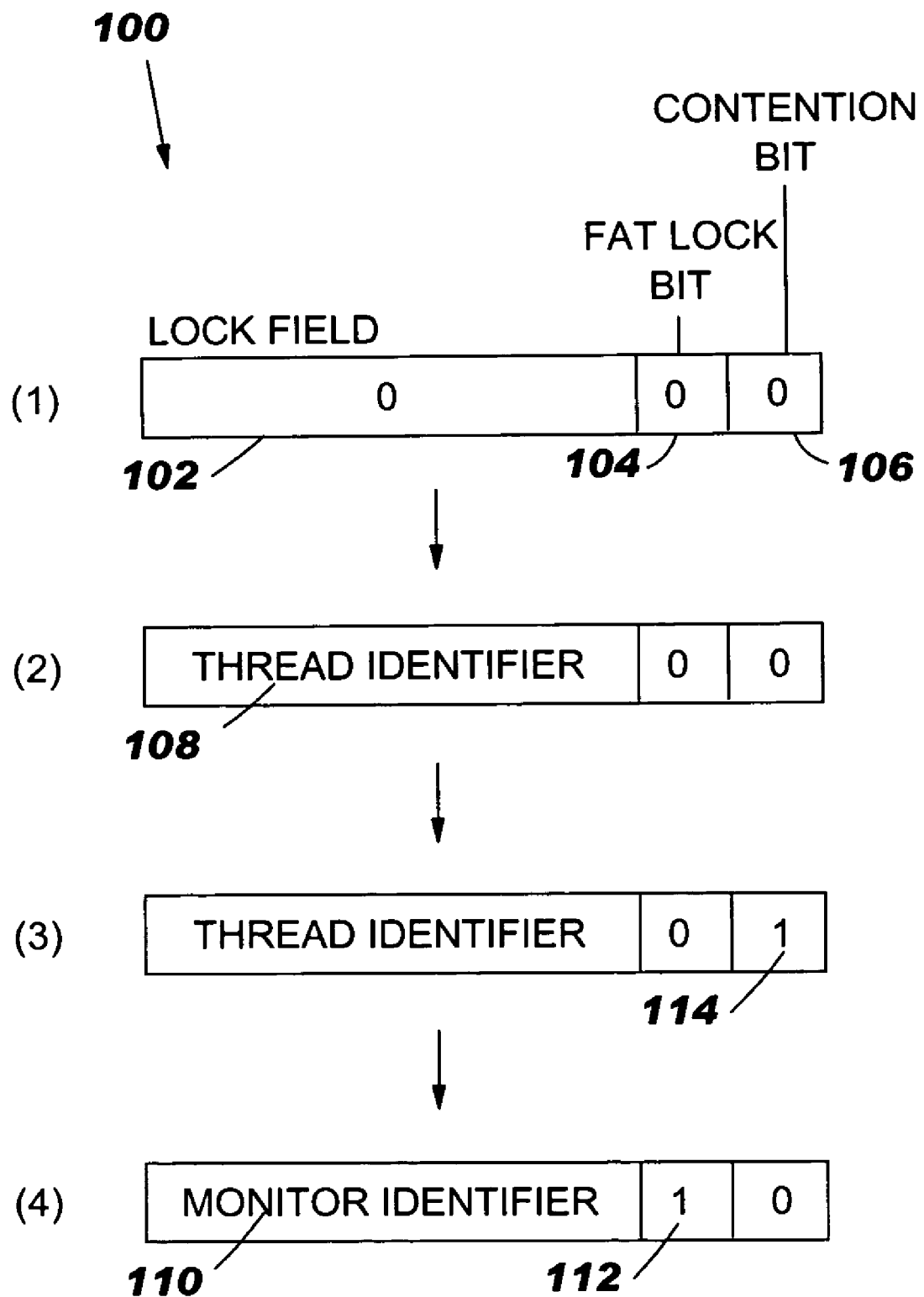

INTEGRATED MULTI-FUNCTION OBJECT LOCKS

BACKGROUND OF THE INVENTION

The present invention generally relates to object locks, and more particularly, to a locking method for Java objects that conserves computing resources by allowing various steps to be executed with a single memory fetch instruction.

A Java Virtual machine (JVM) (Java is a trademark of Sun Microsystems Corp.) is used to support a synchronization primitive known as a "monitor" or "lock" on each Java object allocated in a system. In general, a thread or the like will obtain a lock on an object in order to perform some type of command using the object. A lock is typically used to prevent a conflict from occurring when another thread attempts to use the object. With respect to object management, an efficient implementation of object locks allows for the optimal performance of a JVM implementation. A number of locking methods are cited in U.S. Patent Application Publication No. US 2001/0014905 A1, which is herein incorporated by reference.

BRIEF SUMMARY OF THE INVENTION

According to a first aspect of the present invention, a method for handling object locks comprises storing a thread identifier associated with a first thread in an identifier field of a lock word upon establishment of a lock on an object by the first thread, wherein the lock word further comprises an inflation field for storing a fat lock bit and a contention field for storing a contention bit, and verifying the thread identifier stored in the identifier field and determining a state inflation and a state of contention by reading the lock word.

According to another aspect of the present invention, a method for handling object locks in a Java Virtual Machine comprises storing a thread identifier associated with a first thread in an identifier field of a lock word upon establishment of a lock on a Java object by the first thread, wherein the lock word further comprises an inflation field for storing a fat lock bit and a contention field for storing a contention bit, setting a contention bit in the contention field of the lock word in response to an attempt by a second thread to establish a lock on the Java object, verifying the thread identifier stored in the identifier field and determining a state of the fat lock bit and the contention bit by reading the lock word, releasing the lock on the Java object by the first thread, and inflating the lock in response to determining that the contention bit has been set in the contention field.

According to yet another aspect of the present invention, a unitary lock structure comprises an identifier field for storing a thread identifier associated with a first thread obtaining a lock on an object, an inflation field for storing a fat lock bit upon inflation of the lock on the object, and a contention field for storing a contention bit in response to an attempt by a second thread to obtain a lock on the object.

According to a further aspect of the present invention, a system comprises a lock engagement system for storing a thread identifier associated with a first thread in an identifier field of a lock word upon establishment of a lock on an object by the first thread, wherein the lock word further comprises an inflation field for storing a fat lock bit and a contention field for storing a contention bit, a lock contention system for setting the contention bit in response to an attempt by a second thread to establish a lock on the object, and a verification system for reading the lock word to verify the thread identifier stored in the identifier field and to determine a state of the fat lock bit and the contention bit.

According to a still further aspect of the present invention, a computer program product for handling object locks comprises a computer readable medium having computer readable program code embodied therein. The computer readable program code comprises computer readable program code configured to store a thread identifier associated with a first thread in an identifier field of a lock word upon establishment of a lock on an object by the first thread, wherein the lock word further comprises an inflation field for storing a fat lock bit and a contention field for storing a contention bit, computer readable program code configured to set the contention bit in response to an attempt by a second thread to establish a lock on the object, and computer readable program code configured to read the lock word to verify the thread identifier stored in the identifier field and to determine a state of the fat lock bit and the contention bit.

According to another aspect of the present invention, a system for deploying an application comprises a computer infrastructure being operable to store a thread identifier associated with a first thread in an identifier field of a lock word upon establishment of a lock on an object by the first thread, wherein the lock word further comprises an inflation field for storing a fat lock bit and a contention field for storing a contention bit, set the contention in response to an attempt by a second thread to establish a lock on the object, and verify the thread identifier stored in the identifier field and determine a state of the fat lock bit and the contention bit by reading the lock word.

According to yet another aspect of the present invention, computer software is embodied in a propagated signal. The computer software comprises instructions to cause a computer system to store a thread identifier associated with a first thread in an identifier field of a lock word upon establishment of a lock on an object by the first thread, wherein the lock word further comprises an inflation field for storing a fat lock bit and a contention field for storing a contention bit, set the contention bit in response to an attempt by a second thread to establish a lock on the object, and verify the thread identifier stored in the identifier field and determine a state of the fat lock bit and the contention bit by reading the lock word.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 3 depicts an illustrative object lock word according to one aspect of the present invention.

DETAILED DESCRIPTION OF THE INVENTION

Figure 1:
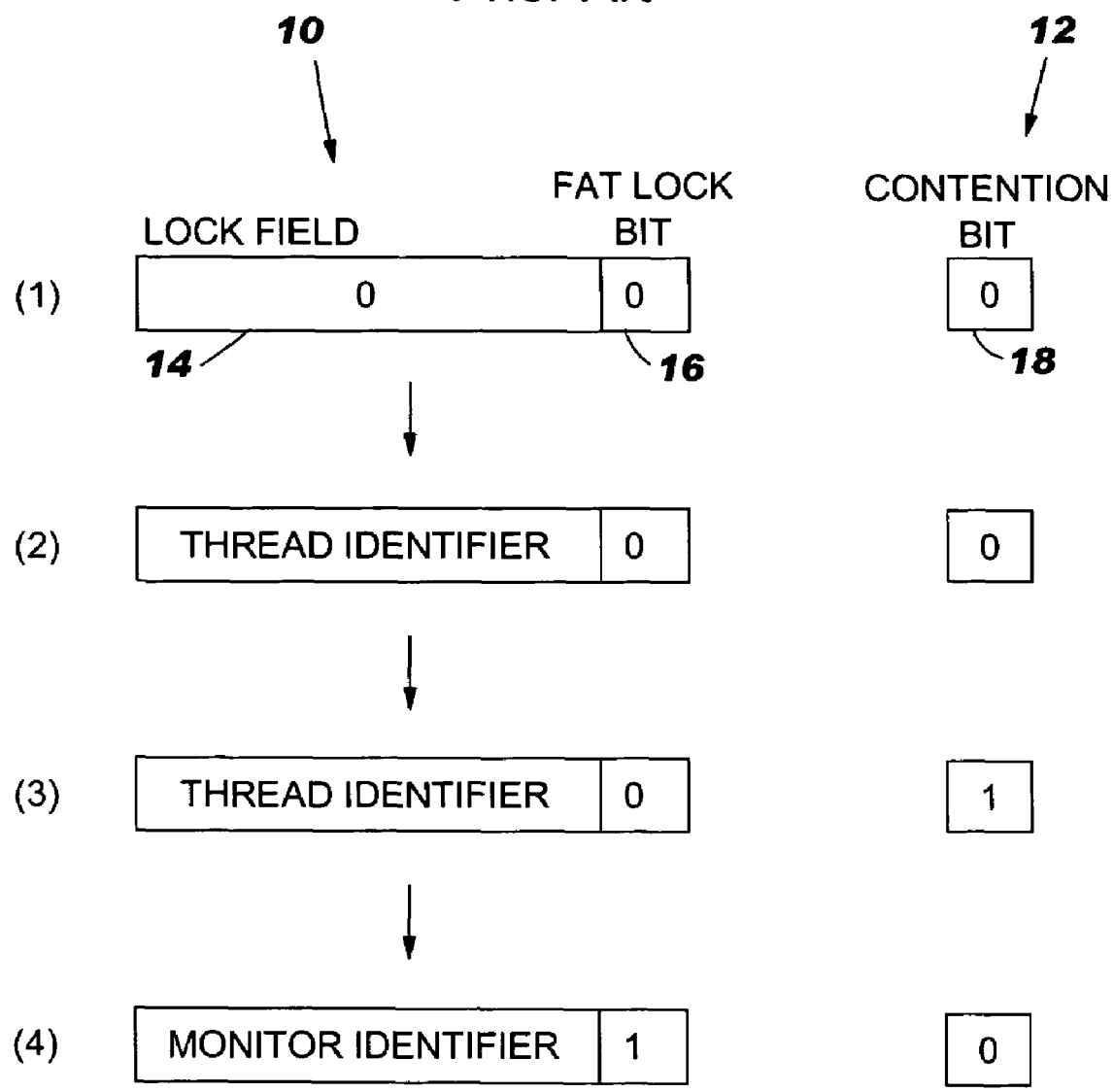
FIG. 1 depicts illustrative object lock words according to the prior art.

Three possible locking methods include the: (1) spin lock; (2) queue lock; and (3) compound lock. In general, a spin locking system stores, into an object, the identifier of a thread that locks an object. According to the spin locking method, when a thread "T" fails to acquire a lock on an object "A" (i.e., when another thread "S" already has a lock on the object "A"), the locking procedure is repeated until it succeeds. Specifically, an atomic machine command (an indivisible command), such as "compare#and#swap," is employed to lock or unlock an object in the following manner:

```
10 /*lock*/
20 while (compare_and_swap(&obj->lock,0,thread_id( ))= =0)
30    yield( );
40 /*obj access*/
...
50 /*unlock*/
60 obj->lock=0
```

As is apparent from the above program code, locking is performed at the 20th and 30th lines, with "yield( )" being repeated until a lock is acquired. The purpose of "yield( )" is the halting of the execution of a current thread, and the shifting of control to a scheduler. Generally, the scheduler selects and operates one of the other executable threads. However, the scheduler eventually operates the original thread later, and until a lock is acquired, a "while" statement is repetitively executed.

The condition provided for the "while" statement on the 20th line (i.e., compare_and_swap) is the comparison of "0" with the contents of field "obj.fwdarw.lock," which is prepared for the object "obj," and the writing of the thread identifier "(thread_id( ))" to its field when the comparison result is true. Therefore, when "0" is stored in the field that is prepared for the object "obj," the absence of a thread that has acquired a lock is indicated. Thus, when unlocking is performed with the 50th line, "0" is stored in the field "obj.fwdarw.lock." This field is one word, for example, but in actuality, the number of bits that is required is only that which is needed to store a thread identifier.

A queue lock system employs a queue to manage the threads that access an object. According to the queue lock method, when a thread "T" fails to lock an object "A," the thread "T" adds itself to the queue for "A," and is suspended. The unlocking code includes code for examining a queue to determine whether it is empty, whereafter, if it is determined the queue is not empty, one thread is extracted and the processing is resumed. A queue lock is implemented together with the scheduling mechanism for an Operating System (OS), and is provided as the API (Application Programming Interface) for the OS. For example, a semaphore or a Mutex variable is a typical queue lock system.

In a queue lock system, one word for space overhead is no longer adequate, tk and something less than 20 bytes is normally required. Further, since a common resource (i.e., a queue) is operated inside the lock or the unlock function, it should be noted that a specific lock is acquired or released.

With a compound locking system, a program ready-for multiple threads is written while taking into account the fact that it is to be executed by multiple threads. Thus, when a common resource is accessed, such access is protected by a lock. However, a library ready for multiple threads may be used by a single-thread program, or lock contentions may seldom occur, even when a program is executed by multiple threads. Actually, according to a profile for the execution of Java programs, for many applications, contentions related to object accessing seldom occur. Therefore, the sequence "locking an object which is not locked, accessing the object, and unlocking the object" is considered to be an execution path that is frequently followed.

In general, the locking processing is performed as follows.

(1) Acquisition of a light lock is attempted by an atomic command (e.g., compare_and_swap). If the lock is acquired, then object access is initiated. When the lock acquisition attempt fails, however, it is ascertained that the locking process has already been shifted to the fat lock method, or that, while the lock is still light, another thread has obtained a lock on the object;

(2) If the lock is already fat, a fat lock is acquired; and (3) When a contention occurs during the light lock process, a light lock is acquired, after which the process is shifted to the process for a fat lock, which is then acquired (in the following explanation, this process is performed by using an "inflate" function).

In general, there are multiple implementations for the compound lock system depending on whether or not "yield" is performed for "acquisition of the light lock" in step (3) above. It should be noted, however, that in most typical compound locking systems, the "thread identifier" and the "fat lock identifier" are usually even numbers other than 0, and that the "thread identifier" is stored when the least significant bit of the lock field is 0, while the "fat lock identifier" is stored when the least significant bit is 1.

Referring to FIG. 1, illustrative lock words 10 and 12 in accordance with previous (e.g., compound) locking methods are shown. Specifically, FIG. 1 depicts an illustrative diagram for explaining the shifting of modes, and the states of a lock field (including a fat lock bit) and a contention bit in each mode, with state: (1) showing the state where a lock has not been acquired; (2) showing a light lock mode where a contention has not occurred; (3) showing a light lock mode where a contention has occurred (i.e., when a second thread "S" attempts to obtain a lock on an object already locked by thread "T"); and (4) showing a fat lock mode. As can been seen, the previous method illustrated by FIG. 1 relies on two separate lock structures/words 10 and 12.

The first lock word 10 includes fields 14 and 16 for storing a thread or monitor identifier, and a fat bit (also referred to as a shape bit or an inflation bit), while the second word 14 includes a field 18 for storing a contention bit. The use of two separate lock words 10 and 12 becomes of particular importance in situations such as where a first thread wishes to unlock an object. Specifically, before the first thread "T" can unlock the object, it will determine: (1) whether it is still the current owner of the lock; and (2) the current states of the shape bit and the contention bit. To do this, both words 10 and 12 must be examined, which requires two separate memory fetch instructions.

In accordance with one aspect of the present invention, a unitary lock structure/word is provided. The lock word may include an identifier field for storing a thread identifier associated with a first thread obtaining a lock on an object; an inflation field for storing a fat lock bit upon inflation of the lock on the object; and a contention field for storing a contention bit in response to an attempt by a second thread to obtain a lock on the object. Storage of these values in a single lock word allows them to be verified with a single memory fetch instruction. For example, when unlocking an object, a single memory fetch instruction can be used to read the lock word to: (1) determine whether thread T is still the current owner of the lock, and (2) determine the states of inflation and/or contention (i.e., determine whether the fat lock and/or contention bits have been set).

It should be understood that the phraseology associated with a thread engaging or obtaining a "lock on an object," is also referred to throughout the art as the thread "entering the monitor" for the object. It should also be understood that although a typical embodiment of the present invention is to optimize Java object locks in a Java Virtual machine (JVM), the teachings described herein could be used to optimize any type of object locks. Thus, the present invention is not intended to be limited to a Java environment. Still yet, it should also be understood that in an illustrative embodiment, the present invention may be implemented in conjunction with a compound locking method. Although a description of an illustrative method according to the present invention will be set forth below, additional background information on compound locking methods can be found in the above-incorporated patent application. To this extent, it should be appreciated that the present invention is not limited to a compound locking method, rather, the teachings recited herein could be implemented in conjunction with other locking methods now known or later developed.

Figure 2:
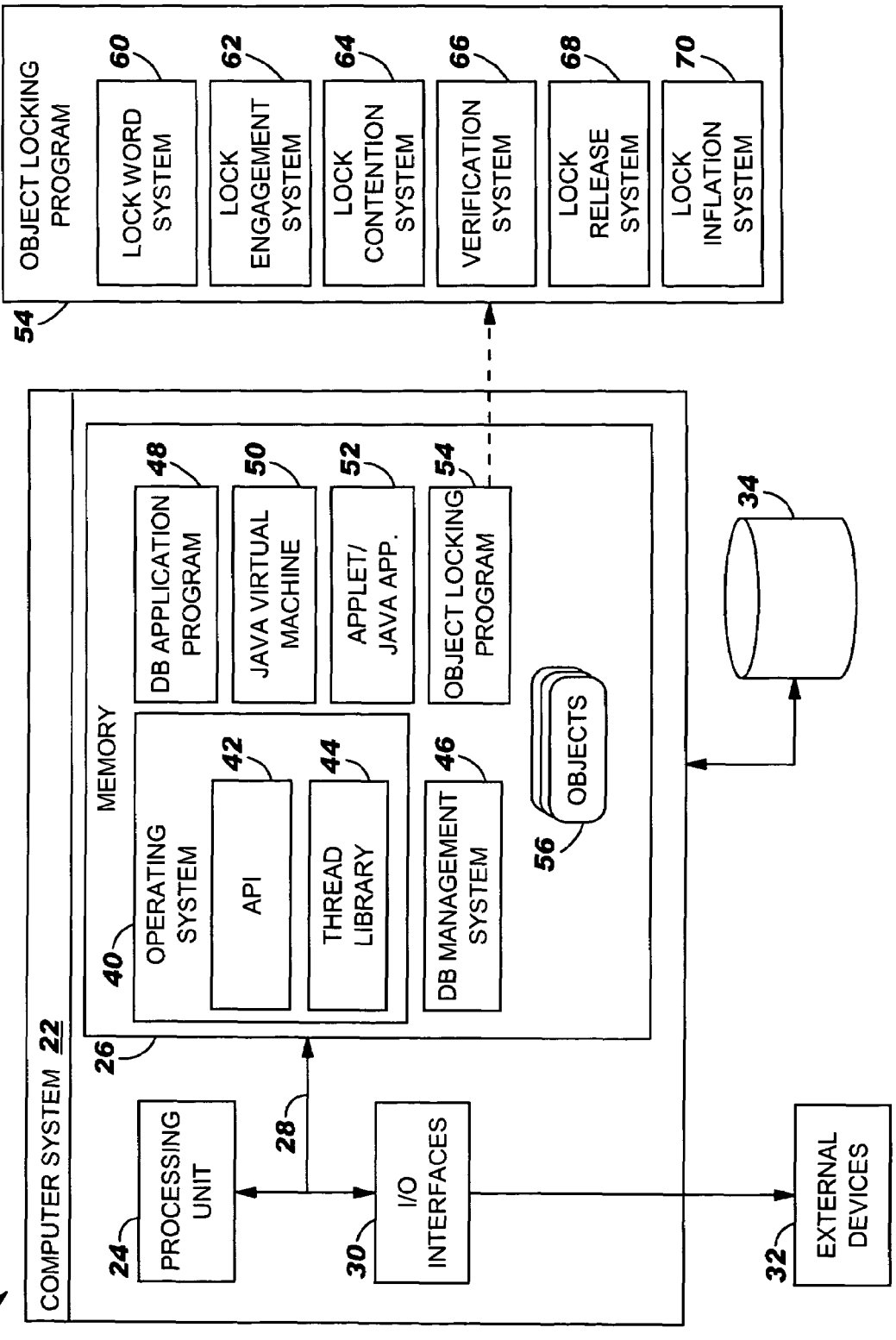
FIG. 2 depicts a system for optimizing object locks according to one aspect of the present invention.

Referring now to FIG. 2, a system 20 that may optimize object locks in a JVM is depicted. As depicted, system 20 includes computer system 22 that may be used to carry out the functions of the present invention. In general, computer system 22 is intended to represent any type of computer system that is capable of utilizing object locks. For example, computer system 22 could be a desktop computer, a laptop computer or a workstation. Moreover, the teachings recited herein could be implemented on a stand-alone computer system (as shown), or over a network. In the case of the latter, computer system 22 could be a client or a server. Also, the network could be any type of network such as the Internet, a local area network (LAN), a wide area network (WAN), a virtual private network (VPN), etc.

Communication throughout the network could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish inter-connectivity.

As depicted, computer system 22 generally includes processing unit 24, memory 26, bus 28, input/output (I/O) interfaces 30, external devices/resources 32 and storage unit 34. Processing unit 24 may comprise a single processing unit, or be distributed across one or more processing units in one or more locations, e.g., on a client and server. Memory 26 may comprise any known type of data storage and/or transmission media, including magnetic media, optical media, random access memory (RAM), read-only memory (ROM), a data cache, a data object, etc. Moreover, similar to processing unit 24, memory 26 may reside at a single physical location, comprising one or more types of data storage, or be distributed across a plurality of physical systems in various forms.

I/O interfaces 30 may comprise any system for exchanging information to/from an external source. External devices/resources 32 may comprise any known type of external device, including speakers, a CRT, LED screen, hand-held device, keyboard, mouse, voice recognition system, speech output system, printer, monitor/display, facsimile, pager, etc. Bus 28 provides a communication link between each of the components in computer system 22 and likewise may comprise any known type of transmission link, including electrical, optical, wireless, etc.

Storage unit 34 can be any system (e.g., a database, etc.) capable of providing storage for information As such, storage unit 34 could include one or more storage devices, such as a magnetic disk drive or an optical disk drive. In another embodiment, storage unit 34 includes data distributed across, for example, a local area network (LAN), wide area network (WAN) or a storage area network (SAN) (not shown). Although not shown, additional components, such as cache memory, communication systems, system software, etc., may be incorporated into computer system 22.

Shown in memory 26 of computer system 26 are various programs/systems. Operating System (OS) 40 can be constituted by a kernel area and a user area, and can include an Application Programming Interface (API) 42. OS 40 can also include a thread library 44 that has a function for enabling an operation performed between the hardware of computer system 22, and an object locking program 54. Thread library 44 may also provide a function for queue locking. Object locking program 54 will be described in further detail below, but generally includes a monitor function and a locking and unlocking function according to the invention. If a database language is employed, a database management system 46 may be provided above OS 40, and a database application program 48 may be executed by the system. When the Java language is employed, a JVM 50 may be provided above OS 40, and an applet or Java application 52 may be executed by JVM 50. The execution of applet or Java application 52 can be performed by multi-threads. For the Java language, the monitor function and the locking and unlocking function may be installed in JVM 50. Further, JVM 50 may be implemented as a part of OS 40.

As further shown in FIG. 2, object locking system 54 includes, lock word system 60, lock engagement system 62, lock contention system 64, verification system 66, lock release system 68, and lock inflation system 70. Each of these systems is shown to conceptually represent program code that carries out the locking method of the present invention. In general, lock word system 60 will provide a unitary object lock word/structure that is used for the locking method of the present invention. Specifically, the unitary lock word provided by lock word system 60 according to one aspect of the present invention includes fields for storing a thread monitor identifier, a fat lock bit and a contention bit.

Referring to FIG. 3, an illustrative lock word 100 according to an aspect of the present invention is depicted. In general, the four states shown depict: (1) the state where a lock has not been acquired; (2) the state where a light lock mode where a contention has not occurred; (3) the state where a light lock mode where a contention has occurred (i.e., when a second thread S attempts to obtain a lock on an object already locked by thread T); and (4) the state where a fat lock mode (e.g., the monitor has been inflated) has occurred.

All fields 102, 104, and 106 are combined into a single, unitary lock word 100. That is, lock word 100 includes an identifier field 102 for storing a thread identifier 108 or monitor identifier 110, a fat lock field 104 for storing a fat lock bit 112, and a contention field 106 for storing a contention (e.g., FLC) bit 114. The combination of fields 102, 104 and 106 into a single lock word provides numerous functions particularly when a thread holding a lock on an object seeks to unlock the object. Specifically, as will be further indicated below, because all three fields 102, 104 and 106 are combined into a single lock word, only one word must be read. That is, a single memory fetch instruction can be used to verify that a current thread still owns the lock on the object, and to determine the states inflation and contention via the states of fat lock bit 112 and/or contention bit 114.

It should be appreciated that although not shown, lock word 100 could also include bits that act as a recursion counter. The primary function of such a counter would be to allow a thread which owns the monitor to enter the monitor recursively a certain number of times without incurring the penalty associated with monitor inflation. On re-entering the monitor, the owner need only increment the value in the recursion field. Typically, a value of zero would be stored in the recursion counter to indicate that the monitor has only been entered once. On exiting the monitor, a single compare instruction which verifies ownership, flatness and absence of contention (as will be further described below) is also sufficient to verify absence of recursion.

In any event, once unitary lock word 100 has been provided, the other systems within object locking program 54 of FIG. 2 will facilitate the use thereof in conjunction with the locking method of the present invention.

Listed below is illustrative pseudo-code for the locking method of the present invention:

```
10      void lock(Object* obj) {
20         /* flat lock path */
30         if (compare_and_swap(&obj->lock, 0, thread_id( )))
40             return;
50         /* inflated lock & inflation path */
60         MonitorID mon = obtain_monitor(obj);
70         monitor_enter(mon);
80         /* inflation loop */
90         Word lockword;
100        while ((( lockword = obj->lock) & SHAPE_BIT) == 0) {
100            if (lockword == 0) {
110                if (compare_and_swap(&obj->lock, 0, thread_id( )))
120                {
130                    /* this thread now owns the flat lock */
140                    monitor_exit(mon);
150                    return;
160                }
170            } else {
180                if (compare_and_swap(&obj->lock,
                           lockword, lockword |
                           FLC_BIT))
190                    monitor_wait(mon, TIMEOUT);
200            }
210        }
220     }
230     void unlock(Object* obj) {
240        /* flat lock path */
250        if (obj->lock == thread_id( )) {
260            /* expected case -- extremely fast */
270            obj->lock = 0;
280            return;
290        }
300        if (obj->lock & FLC_BIT) {
310            MonitorId mon = obtain_monitor(obj);
320            monitor_enter(mon);
330            obj->lock = mon & SHAPE_BIT;
340            monitor_notify(mon);
350            monitor_exit(mon);
360            return;
370        }
380        /* inflated lock path */
390        if (obj->lock & SHAPE_BIT) {
400            Word lockword = obj->lock;
410            if (no thread waiting on obj)
420                if (better to deflate)
430                    obj->lock = 0; /* deflation */
440            monitor_exit(lockword & ~SHAPE_BIT);
450            return;
460        }
470     }
```

This code will be explained with specific reference to FIGS. 2 and 3. Under the above code, when a thread "T" seeks to establish a lock on an object 56 it must first be ensured that no other thread already holds a lock on that object 56. If lock word 100 appears as it is shown in state (1) of FIG. 3, it means that the object is unlocked and thread "T" is free to establish a lock thereon. When the lock is established, lock engagement system 62 will move lock word 100 to state (2). Specifically, a thread identifier associated with thread "T" will be stored in identifier field 102. This process is known as a establishing a light lock without contention and is shown in lines 10-40 of the above code. Moreover, obtaining the lock on object 56 and storing the thread identifier is typically accomplished with an atomic compare and swap command. Specifically, lock engagement system 62 examines the data elements in lock word 100 at stage (1) to ensure that object 56 is unlocked, and replace the same with the data elements shown in stage (2).

Now assume that a second thread "S" wishes to acquire a lock on object 56. State (2) of lock word 100 will show thread "S" that a lock on object 56 is already held by thread "T." Accordingly, if thread "S" wishes to engage a lock on object 56, it must wait until thread "T" unlocks object 56. However, to express that thread "S" desires a lock on object 56, a contention will be registered. Specifically, according to lines 80-220 of the above code, lock contention system 64 will set contention (e.g., FLC) bit 114 in contention field 106. This is shown in stage (3) of lock word 100 and lets thread "T" know that another thread wishes to obtain a lock on object 56.

After thread "T" has finished performing any operations using object 56, it can release the lock. However, because the contention bit has been set, thread T will inflate the lock as shown in state (4). Under the present invention, the unitary structure of lock word 100 provides significant advantages during the lock release process. Specifically, when release of the lock is desired, lines 230-390 of the above code will be followed. To this extent, verification system 66 will first verify that thread "T" is still the current holder of the lock on object 56, and will check/determine the states of fat lock bit 112 and/or contention bit 114. Since the present invention utilizes a single lock word 100, these functions can be carried out with a single memory fetch instruction (i.e., only a single word must be read). Line 250 of the above code states "if (obj->lock==thread_id( )) {." This line tests whether the: (1) current thread is the lock owner; (2) fat lock bit is clear; (3) contention bit is clear; and, although not shown, (4) thread T has not recursively "entered the monitor."

In any event, at stage (3), verification system 66 will detect that contention (FLC) bit 114 has been set in contention field 106, while fat lock bit 112 is clear (i.e., has not been set). Thus, a contention state will be recognized. Thereafter, lock release system 68 will release the lock for inflation. To inflate the lock, lock inflation system 70 will move lock word 100 to state (4), as shown by lines 300-360 of the above code. Specifically, the data elements shown in stage (3) will be replaced by those shown in stage (4). To this extent, lock inflation system 70 will store a monitor identifier 110 in identifier field 102, and set the fat lock bit 112 in inflation field 104. Thereafter, other threads desiring a lock on object 56 such as thread "S" can form a queue (e.g., in accordance with the queue locking method described above) to establish the desired locks.

It should be understood that since lock word 100 is a unitary structure, the present invention will also take steps to help ensure that the contention bit 114 shown in stage (3) is not dropped. Specifically, because some of the functions performed herein, such as the release of the lock by thread T could be performed using non-atomic techniques, there could be a chance the contention field 106 could be inadvertently cleared before the lock is inflated. This could cause lock word 100 to be accidentally reverted to stage (1) instead of being inflated to stage (4). To help avoid this, a thread that has set contention bit 114 (e.g., thread "S") will periodically "wake-up" and verify that contention bit 114 is still set. This function could be managed/performed by lock contention system 64.

It should also be understood that the teachings of the present invention could be used in conjunction with any type of locking method. Still yet, it should be appreciated that the teachings of the present invention could be offered as a business method on a subscription or fee basis. For example, computer system 22 could be created, maintained and/or deployed by a service provider that offers the functions described herein for customers. That is, a service provider could offer to manage/optimize object locks for a customer as describe above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of object locking system 54 of FIG. 2 is intended to be illustrative only. As such, object locking system 54 could be represented by a different configuration of systems.

I claim:

1. A method for handling object locks, comprising:
   storing a thread identifier associated with a first thread in an identifier field of a lock word upon establishment of a lock on an object by the first thread, wherein the lock word further comprises an inflation field for storing a fat lock bit and a contention field for storing a contention bit; and
   verifying the thread identifier stored in the identifier field and determining a state of inflation and a state of contention by reading the lock word,
   wherein the lock word provides a unitary structure for facilitating multiple types of locking and is retrieved in a single memory fetch instruction.

2. The method of claim 1, further comprising releasing the lock on the object by the first thread.

3. The method of claim 1, wherein verifying the thread identifier stored in the identifier field and determining a state of inflation and a state of contention by reading the lock word comprises determining whether the fat lock bit has been set in the inflation field and whether the contention bit has been set in the contention field.

4. The method of claim 1, the lock word further including a recursion counter that comprises at least one bit that permits a thread that owns a monitor to enter the monitor recursively a plurality of times.

5. The method of claim 1, further comprising setting the contention bit in the contention field of the lock word in response to an attempt by a second thread to establish a lock on the object.

6. The method of claim 5, further comprising the second thread periodically Checking that the contention bit is still set.

7. The method of claim 5, further comprising inflating the lock in response to the setting of the contention bit in the contention field.

8. The method of claim 7, wherein inflating the lock in response to the setting of the contention bit in the contention field comprises storing a monitor identifier in the identifier field and setting the fat lock bit in the inflation field.

9. The method of claim 1, wherein the object is a JAVA object.

10. A method for handling object locks in a JAVA Virtual Machine (JYM), comprising: storing a thread identifier associated with a first thread in an identifier field of a lock word upon establishment of a lock on a Java object by the first thread, wherein the lock word farther comprises an inflation field for storing a fat lock bit and a contention field for storing a contention bit; setting a contention bit in the contention field of the lock word in response to an attempt by a second thread to establish a lock on the Java object; verifying the thread identifier stored in the identifier field and determining a state of the fat lock bit and the contention bit by reading the lock word; releasing the lock on the Java object by the first thread; and inflating the lock in response to determining that the contention bit has been set in the contention field,
   wherein the lock word provides a unitary structure for facilitating multiple types of locking and is retrieved in a single memory fetch instruction.

11. The method of claim 10, wherein verifying the thread identifier stored in the identifier field and determining a state of the fat lock bit and the contention bit by reading the lock word comprises determining whether the contention bit has been set in the contention field.

12. The method of claim 10, wherein inflating the lock in response to determining That the contention bit has been set in the contention field comprises storing a monitor identifier in the identifier field and setting the fat lock bit in the inflation field.

13. A system having at least one computer device, the computer device having a non-separate unitary lock structure, comprising:
   a single memory location, having:
      an identifier field for storing a thread identifier associated with a first thread obtaining a lock on an object; an inflation field for storing a fat lock bit upon inflation of the lock on the object; and
      a contention field for storing a contention bit in response to an attempt by a second thread to obtain a lock on the object,
   wherein the lock word provides a unitary structure for facilitating multiple types of locking and is retrieved in a single memory fetch instruction.

14. The system of claim 13, wherein the unitary lock structure comprises a single lock word.

15. The system of claim 13, wherein the object is a JAVA object.

16. The system of claim 13, wherein the identifier field alternatively stores a monitor identifier upon inflation of the lock on the object.

17. A computer implemented system comprising:
a processor; and
a memory, the memory having:
a lock engagement system for storing a thread identifier associated with a first thread in an identifier field of a lock word upon establishment of a lock on an object by the first thread, wherein the lock word further comprises an inflation field for storing a fat lock bit and a contention field for storing a contention bit; a lock contention system for setting the contention bit in response to an attempt by a second thread to establish a lock on the object; and a verification system for reading the lock word to verify the thread identifier stored in the identifier field and to determine a state of the fat lock bit and the contention bit,
wherein the lock word provides a unitary structure for facilitating multiple types of locking and is retrieved in a single memory fetch instruction.

18. The system of claim 17, further comprising a lock word system for generating the lock word.

19. The system of claim 17, further comprising a lock release system for resetting the identifier field upon release of the lock on the object by the first thread if the contention bit has not been set in the contention field.

20. The system of claim 17, further comprising a lock inflation system for inflating the lock upon release of the lock on the object by the first thread if the contention bit has been set in the contention field.

21. The system of claim 20, wherein the lock inflation system inflates the lock by storing a monitor identifier in the identifier field and setting the fat lock bit in the inflation field.

22. The system of claim 17, the lock word further including a recursion counter that comprises at least one bit that permits a thread that owns a monitor to enter the monitor recursively a plurality of times.

23. The system of claim 17, wherein the object is a JAVA object.

24. A storage device having a computer program product stored thereon for handling object locks, the computer readable program code comprising: computer readable program code configured to store a thread identifier associated with a first thread in an identifier field of a lock word upon establishment of a lock on an object by the first thread, wherein the lock word further comprises an inflation field for storing a fat lock bit and a contention field for storing a contention bit; computer readable program code configured to set the contention bit in response to an attempt by a second thread to establish a lock on the object; and computer readable program code configured to read the lock word to verify the thread identifier stored in the identifier field and to determine a state of the fat lock bit and the contention bit, wherein the lock word provides a unitary structure for facilitating multiple types of locking and is retrieved in a single memory fetch instruction.

25. The storage device of claim 24, further comprising computer readable program code configured to generate the lock word.

26. The storage device of claim 24, further comprising computer readable program code configured to reset the identifier field upon release of the lock on the object by the first thread if the contention bit has not been set in the contention field.

27. The storage device of claim 26, wherein the computer readable program code configured to inflate the lock upon the release of the lock on the object by the first thread if the contention bit has been set in the contention field includes computer readable program code configured to inflate the lock by storing a monitor identifier in the identifier field and setting the fat lock bit in the inflation field.

28. The storage device of claim 24, further comprising computer readable program code configured to inflate the lock upon the release of the lock on the object by the first thread if the contention bit has been set in the contention field.

29. The storage device of claim 24, the lock word further including a recursion counter that comprises at least one bit that permits a thread that owns a monitor to enter the monitor recursively a plurality of times.

30. The storage device of claim 24, wherein the object is a JAVA object.

31. A system for deploying an application, comprising: a computer system having at least one computer device and being operable to: store a thread identifier associated with a first thread in an identifier field of a lock word upon establishment of a lock on an object by the first thread, wherein the lock word further comprises an inflation field for storing a fat lock bit and a contention field for storing a contention bit; set the contention in response to an attempt by a second thread to establish a lock on the object; and verify the thread identifier stored in the identifier field and determine a state of the fat lock bit and the contention bit by reading the lock word.

32. The system of claim 31, the lock word further including a recursion counter that comprises at least one bit that permits a thread that owns a monitor to enter the monitor recursively a plurality of times.

33. A computer apparatus having computer software embodied therein, the computer software comprising instructions to cause a computer system to perform the following functions: store a thread identifier associated with a first thread in an identifier field of a lock word upon establishment of a lock on an object by the first thread, wherein the lock word further comprises an inflation field for storing a fat lock bit and a contention field for storing a contention bit; set the contention bit in response to an attempt by a second thread to establish a lock on the object; and verify the thread identifier stored in the identifier field and determine a state of the fat lock bit and the contention bit by reading the lock word.

34. The computer apparatus of claim 33, the lock word further including a recursion counter that comprises at least one bit that permits a thread that owns a monitor to enter the monitor recursively a plurality of times.

* * * * *